(12) United States Patent
Weiss et al.

(10) Patent No.: US 6,460,037 B1
(45) Date of Patent: *Oct. 1, 2002

(54) AGENT-BASED DATA MINING AND WAREHOUSING

(75) Inventors: Michael Weiss, Ottawa (CA); Sergueii Mankovskii, Nepean (CA)

(73) Assignee: Mitel Knowledge Corporation, Kanata (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/241,304

(22) Filed: Feb. 1, 1999

(30) Foreign Application Priority Data

Apr. 1, 1998 (GB) ............................................. 9806879

(51) Int. Cl.[7] .............................................. G06F 17/30
(52) U.S. Cl. ....................... 707/10; 707/104.1; 709/202
(58) Field of Search ........................ 707/10, 104, 104.1; 709/201, 202; 705/26

(56) References Cited

U.S. PATENT DOCUMENTS 5,638,494 A * 6/1997 Pinard et al. ............... 709/202
5,655,081 A * 8/1997 Bonnell et al. .............. 395/200
5,752,246 A * 5/1998 Rogers et al. ................ 707/10
5,761,663 A * 6/1998 Legarde et al. ............... 707/10
5,809,478 A * 9/1998 Greco et al. .................... 705/4
5,983,200 A * 11/1999 Slotznick ...................... 705/26
6,108,004 A * 8/2000 Medl ............................ 706/16
6,128,624 A * 10/2000 Papierniak et al. ......... 707/104
6,151,584 A * 11/2000 Papierniak et al. ........... 705/10
6,151,601 A * 11/2000 Papierniak et al. ........... 707/10

FOREIGN PATENT DOCUMENTS

EP        0747845 A1    11/1996

OTHER PUBLICATIONS

Srinivasan et al., Maintaining Temporal Coherency of Virtual Data Wahehouses, Real–time Systems Symposium, 1998. Proceedings. The 19th IEEE, p. 60–70.*

* cited by examiner

Primary Examiner—Greta L. Robinson
(74) Attorney, Agent, or Firm—Marks & Clerk

(57) ABSTRACT

An agent-based networking system and process for building a data warehouse containing application specific information and for mining data therefrom. The networking system utilizes functional and resource agents to communicate with distributed databases in order to collect pertinent data. The agents employ multiple strategies for identifying and resolving potential ambiguities involving information gathered by the process.

15 Claims, 4 Drawing Sheets

AGENT-BASED DATA MINING AND WAREHOUSING

FIELD OF THE INVENTION

This invention relates to data storage and retrieval and more particularly to an agent-based networking system for creating a data warehouse and to a method of accessing the same for real time retrieval of application specific data.

BACKGROUND

The typical approach to data mining is to start with data warehousing, that is, with creating an inventory of data, the data warehouse, and removing ambiguous information. The creation of a data warehouse is concerned with schemes and methods of integrating legacy databases so that they can be accessed in a uniform and manageable framework. This involves data storage, data selection, data cleaning and an infrastructure for updating databases once new knowledge or representations are developed.

The data warehouse is then used to extract knowledge about hidden relationships in the data (data mining). The problem with this approach is that data mining can only be performed after the warehouse has been created, a process which can take up to several years. The reasons that data warehousing is so time-consuming are ambiguity and distribution.

The ambiguity results from differences in the query languages and data formats of different databases, and may also be inherent in the information, for example, misspelling of names, or different names for the same street. This becomes all the more significant as the number of data sources proliferates. Consider, for example, the information reaching a television set as a stream of signals that need to be cataloged, indexed, and perhaps searched for interesting content at a higher level such as channel, programs, genre, or mood. Or consider the information that could be tracked about callers into a call center (for example, names, company, product or service they are calling about).

Distribution as in the way an organization's data is spread across multiple databases creates a situation where it is difficult to obtain an organization-wide view on the data. Many relationships between the data which are crucial to organizational decision-making remain unknown or incomprehensible. To derive them it is necessary to integrate the data from various databases. Management of multiple databases on an organization-wide basis is commonly performed by a network management system. Within a network management system an agent may be located in a workstation or other management device to collect information locally and provide that information to requesting devices when required. The present invention relies on a network of agents to access data in distributed databases and provide to a network management device near real-time application specific information.

SUMMARY OF THE INVENTION

According to a first aspect of the present invention there is provided an agent-based system for creating and accessing a data warehouse comprising:
 a network of interconnected distributed databases;
 a user agent connected to the network for initiating an application specific request for data;
 a plurality of functional agents for receiving goals from the user agent and for invoking processes for completing the goals; and
 a plurality of resource agents, each associated with one of the distributed databases, for receiving and storing goals from the functional agents and obtaining application specific data from appropriate databases for use by the user agent.

According to a second aspect of the invention there is provided a method of generating an application specific data warehouse comprising:
 providing a network of interconnected distributed databases;
 providing a user agent connected to the network for entering a request for application specific data;
 providing a plurality of functional agents for receiving goals from the user agent and for invoking processes for completing the goals; and
 providing a plurality of resource agents associated with the databases for receiving and storing goals from the functional agents and obtaining application specific data from appropriated databases.

BRIEF DESCRIPTION OF THE DRAWINGS

The invention will now be described in greater detail with reference to the attached drawings wherein.

DETAILED DESCRIPTION OF THE INVENTION

Figure 1:
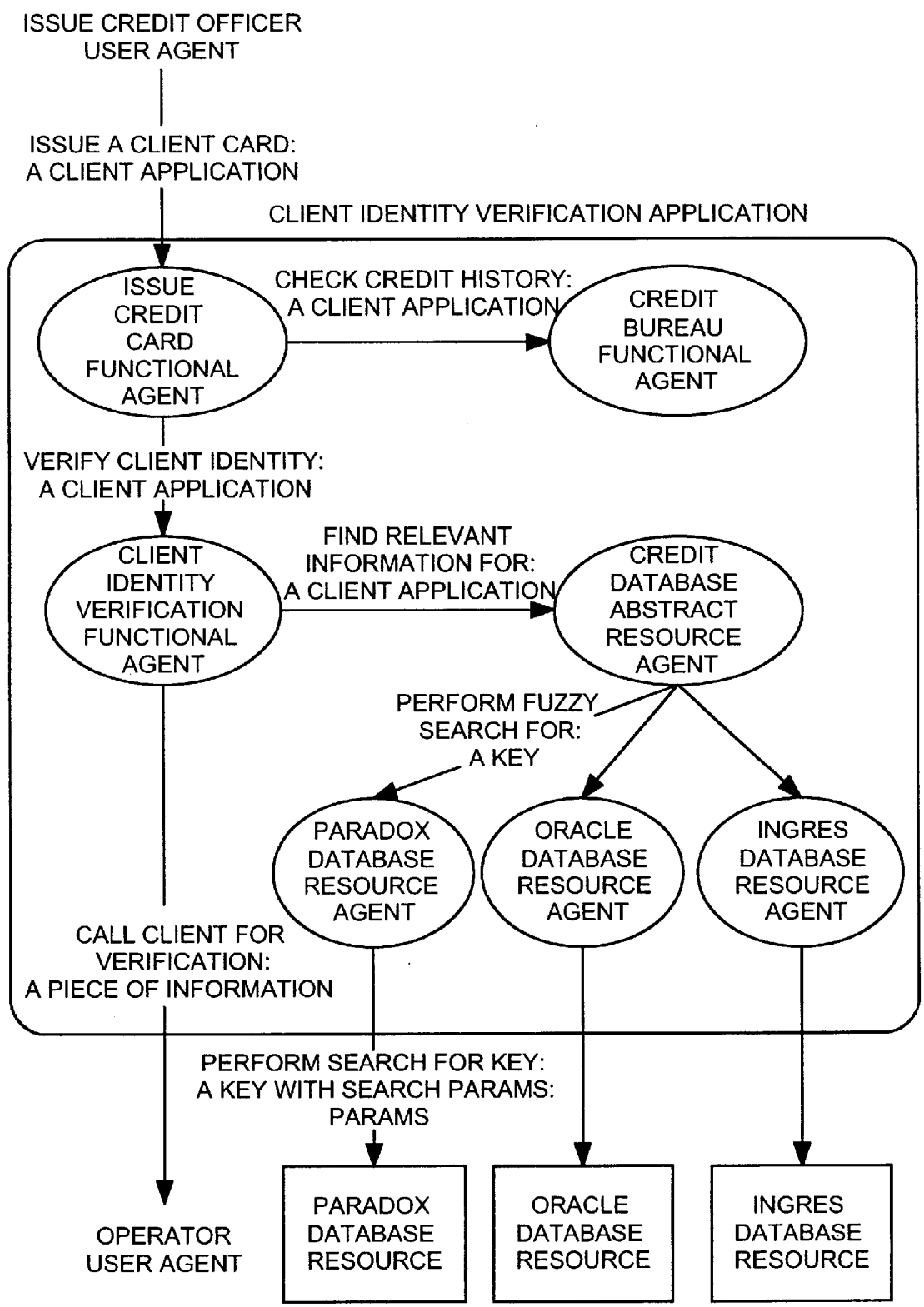
FIG. 1 is a flow diagram of one implementation of the present invention.

The invention is based on four key components:
 distributed data integration by a network of functional agents that process goals and resource agents that communicate with databases;
 agents pursuing different strategies for identifying and resolving data ambiguities (conflicts between data items) in multiple databases;
 encapsulation of database-specific APIs and extension of the functionality of databases through agents; and
 agents managing the workflows for the storage, selection, cleaning, updating and extracting of data and controlling the work of other agents The concept of agents used is that described in U.S. Pat. No. 5,638,494 which issued Jun. 10, 1997 to Pinard et al and assigned to the assignee of the present application. Reference should be made to the subject US Patent for greater details concerning agent based networking. The patent describes a method of operating a communication system that contains multiple functional agents for receiving goals and for invoking a process to achieve the goals, and multiple resource agents, each communicating with its own resource, for receiving and storing goals from a functional agent, and for operating its corresponding resource in response to receiving the goals from a functional agent. The agents are interconnected into a network of agents which provides the infrastructure for passing goals between the agents.

The terminology used in the present application differs slightly from terminology used in the U.S. Pat. No. 5,638,494 patent. In this application, process agents are referred to as functional agents, devices as resources, device agents as resource agents, and device group agents as abstract resource agents.

As stated above, data mining currently can only be performed after the warehouse is created, a time-consuming process. In an agent-based approach to data mining, required portions of the data warehouse can be created on demand, and can be used for data mining immediately. The agent approach allows this because it deals with distribution and ambiguity as follows.

Distribution is handled by mirroring the physical distribution of data in the organization in a network of agents, comprising functional agents that execute the workflows required for the storage, selection, cleaning and an updating of data; user agents to represent the human workers that initiate and participate in the workflow; and resource agents that interact with the databases through the database-specific Application Programming Interfaces (APIs) and may also enhance the functionality of the database.

Ambiguity is handled by employing multiple strategies in one agent for identifying and resolving ambiguities. These are strategies such as "compare names for similar spelling", "cluster persons with the same address" for the identification of ambiguities and strategies such as "if two people have similar spelling and the same address they are very likely identical" for the resolution of ambiguities.

The state of the art in data mining is surveyed in a special issue of IEEE Intelligent Systems (October 1996). The semantic integration of data for information retrieval in heterogeneous environments is reviewed in an article by R. Bayardo et al "Infosleuth: Semantic Integration of Information in Open and Dynamic Environments" MCC, 1997.

In the preferred embodiment of an agent, the strategies for identifying and resolving ambiguities are executed in knowledge sources which communicate using a blackboard system. Blackboard systems and the concept of knowledge sources have been described by Corkill in AI Expert, 41–47 September 1991, and by H. P. Nii "Blackboard Systems: The Blackboard Model of Problem Solving and the Evolution of Blackboard Architectures" 1986.

For the purpose of illustration the invention will be described using the specific example of processing a client application for a credit card (client identity verification). We describe a possible set of agents that can perform this task and illustrate their interactions through a detailed scenario.

These agents are used in the client identity verification application:

Issue credit officer user agent;
Issue credit card functional agent;
Credit bureau functional agent;
Client identity verification functional agent;
Operator user agent;
Credit database abstract resource agent; and
Resource agents for each database.
The agents interact with the following resources:
Paradox, Oracle, Ingres database
Issue credit officer
Operator This scenario shows the interactions between the agents and/or the resources involved in verifying the identity of a client, as shown in FIG. 1.

The rationale for this workflow is that if the client is already in some database then don't issue the card. This rationale is decomposed into a number of processes which are then distributed on a network of interacting agents. As described in the aforementioned U.S. Pat. No. (5,638,494) each process defines a sequence of steps which is executed when a specific goal is received by an agent. Agents trigger the execution of processes in other agents by exchanging goals.

For example, in order to meet the above rationale, the ISSUE CREDIT CARD FUNCTIONAL AGENT issues the goals "verifyClientIdentity: aClientApplication" and "checkCreditHistory: aClientApplication". In this particular embodiment, goals are specified by a keyword that identifies the goal (for example, "verifyClientIdentity:") and a set of associated parameters ("aClientApplication"). Multiple parameters are separated by further keywords as in the goal "performSearchFor: aKey withSearchParams: params".

Upon receiving a goal an agent then uses it to lookup the appropriate process by which it can satisfy the goal. For example, the CLIENT IDENTITY VERIFICATION FUNCTIONAL AGENT first sends a goal to find existing information on the client to the CLIENT DATABASE ABSTRACT RESOURCE AGENT. If multiple database entries related to the client can be found, but the agent cannot identify the ambiguities given its current strategies, the CLIENT IDENTITY FUNCTIONAL AGENT sends a goal to the OPERATOR USER AGENT to ask the human Operator for help.

As described in the U.S. Pat. No. 5,638,494 patent an agent that requires services from another agent or a resource to accomplish its goals needs usage rights over that agent or resource. The direction of the arrows in FIG. 1 indicates both the primary flow of the control through the application as well as the usage rights. A usage right defines which operations an agent may perform on another together with capacity and quality of service constraints. Usage rights may be distributed in accordance with the priorities of the organization. In this case, the priority would equate to which data mining tasks are more important than others.

The following is a step by step description of the processes involved in a client application for a credit card.

1. The Issue credit officer enters information on a credit card applicant into a terminal where it is received by the ISSUE CREDIT OFFICER USER AGENT.
2. The ISSUE CREDIT OFFICER USER AGENT asks the ISSUE CREDIT CARD FUNCTIONAL AGENT to issue a client card for the client application. In the goal the record of the client application (aClientApplication) is passed as a parameter.
3. The ISSUE CREDIT CARD FUNCTIONAL AGENT orders the CLIENT IDENTITY VERIFICATION FUNCTIONAL AGENT to verify the client identity for the client application (aClientApplication).
4. The CLIENT IDENTITY VERIFICATION FUNCTIONAL AGENT queries the CREDIT DATABASE ABSTRACT RESOURCE AGENT to find relevant information for the client application (aClientApplication).
5. The CREDIT DATABASE ABSTRACT RESOURCE AGENT performs a fuzzy search on each database that holds information about keys (aKey) in the client application. The fuzzy search retrieves similar entries from the database. Similarity is defined by an appropriate distance measure. For example, the names "Mankovski", "Mankovskii" and "Mankowski" would be considered similar, because they can be derived from each other through simple permutations. One way of performing the fuzzy search is to translate the original query into a number of queries for different permutations on a search key such as the name. Another is to retrieve a range of subsequent database entries and computing relative distances. The fuzzy search is used by one of the strategies employed by the CLIENT IDENTITY VERIFICATION FUNCTIONAL AGENT to find ambiguities.

6. Each database resource agent performs a search for each requested key (aKey) using the specified search parameters (params) and returns the result to the CREDIT DATABASE ABSTRACT RESOURCE AGENT. The fuzzy search might involve multiple requests to the database resource agent.
7. The CREDIT DATABASE ABSTRACT RESOURCE AGENT consolidates the information retrieved from its database resource agents a list of database entries that match the query to the CLIENT IDENTITY VERIFICATION FUNCTIONAL AGENT.
8. The CLIENT IDENTITY VERIFICATION FUNCTIONAL AGENT uses its strategy to find ambiguities in the information returned by the CREDIT DATABASE ABSTRACT RESOURCE AGENT. Examples of strategies are to look for apparent misspellings, for previous, failed credit applications by the client, or for records on credits applied for by the client's spouse.
9. The CLIENT IDENTITY VERIFICATION FUNCTIONAL AGENT resolves ambiguities identified in the previous step. This may include interaction with a human operator, if the agent could not resolve an ambiguity with sufficient certainty. In this case it asks the Operator to verify the information.
10. The CLIENT IDENTITY VERIFICATION FUNCTIONAL AGENT consolidates the verified information and, if there is any evidence of the client already being in the database, returns it to the ISSUE CREDIT CARD FUNCTIONAL AGENT.
11. If no evidence has been found, the Credit identify verification workflow can continue, for example, with checking the client's credit history. The ISSUE CREDIT CARD FUNCTIONAL AGENT proceeds by sending a goal to the CREDIT BUREAU FUNCTIONAL AGENT to check the credit history of the client. The remainder of that workflow is not shown.

Figure 2:
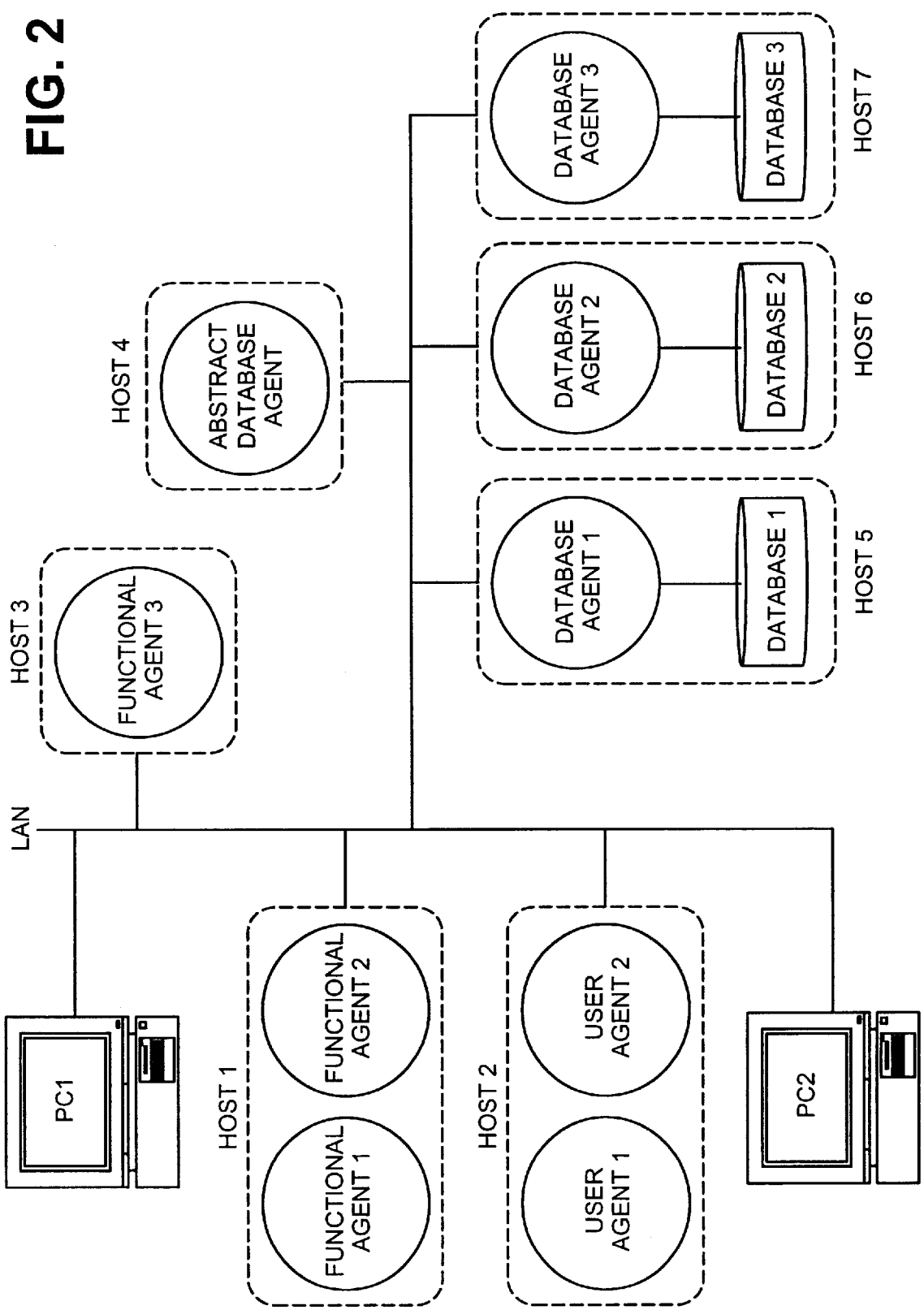
FIG. 2 is a high level block diagram of a specific physical embodiment of the invention.

FIG. 2 shows a specific physical embodiment of the invention. The system components are connected by a LAN. The computers PC 1 and PC 2 are connected to the LAN. PC 1 is used to enter client information and to trigger a client identify verification. PC 2 is used to interact with the Operator when the application requires the Operator's intervention.

The computers Host 1 to Host 7 are also connected to the LAN. The agents and database resources run in programs on these computers.

Host I hosts Functional Agent 1 and Functional Agent 2. Functional Agent 1 is a program that executes the logic of the ISSUE CREDIT CARD FUNCTIONAL AGENT. Functional Agent 2 executes the CREDIT IDENTITY VERIFICATION FUNCTIONAL AGENT. Host 2 hosts the user agents for the Issue credit officer and the Operator. User Agent 1 executes the ISSUE CREDIT OFFICER USER AGENT, User Agent 2 the OPERATOR USER AGENT. Host 3 hosts the CREDIT BUREAU FUNCTIONAL AGENT.

The CREDIT DATABASE ABSTRACT RESOURCE AGENT executes on host 4. The database resource agents for the Paradox, Oracle and Ingres databases run on hosts 5, 6 and 7, on the same hosts as the actual databases.

Figure 3:
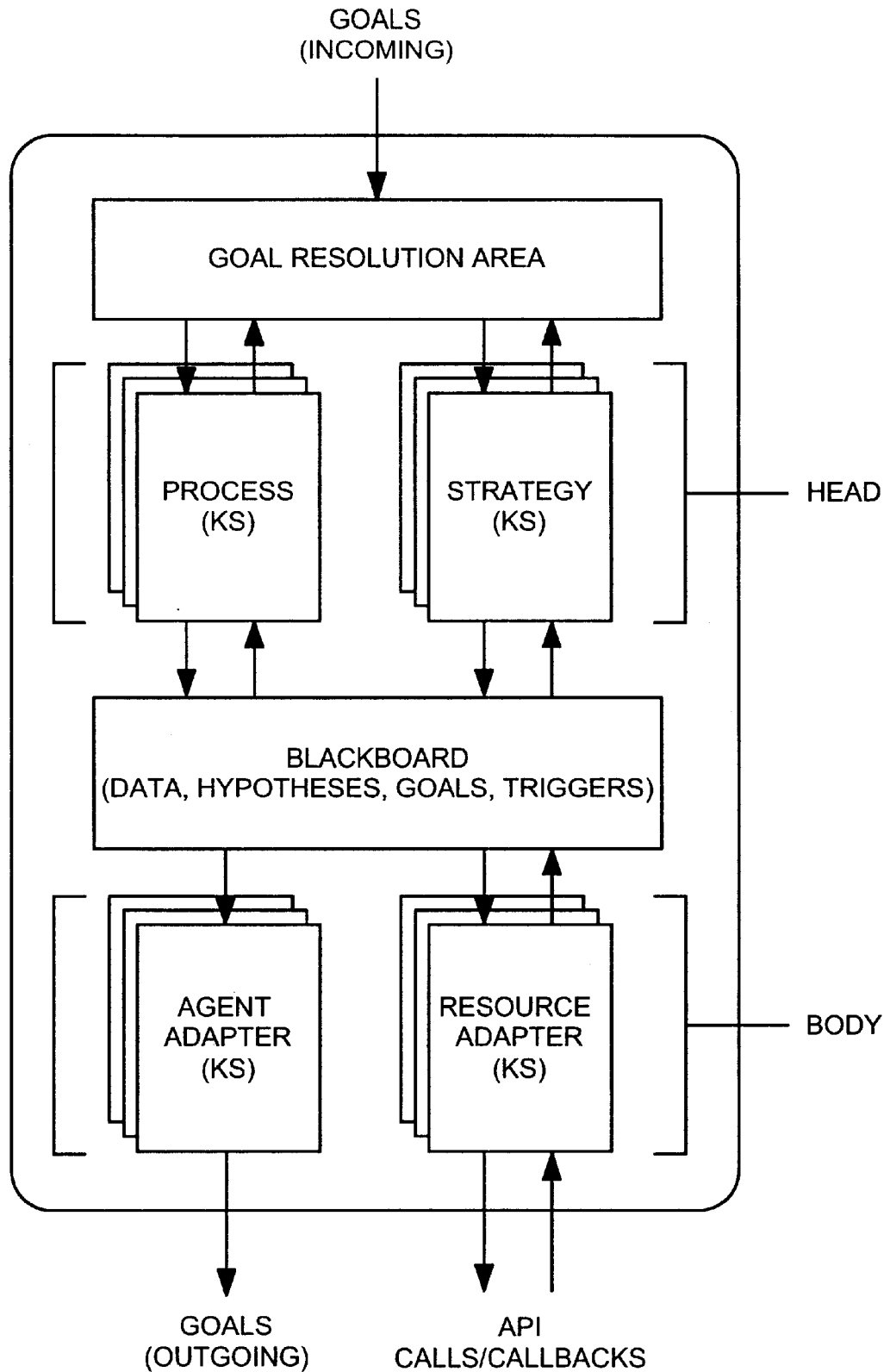
FIG. 3 illustrates the internal structure of an agent.

FIG. 3 shows the internal structure of an agent. In this embodiment, each agent has a head-body architecture found in many agent-based systems. A head-body agent has two subsystems: a control subsystem (head) and an action subsystem (body). The head processes external goals, which have been sent by other agents, as well as internal goals, which result from the decomposition of an external goal, or to internal triggers generated in the body. The body interacts with external resources and provides the mechanisms for sending goals to other agents. Head and body communicate through a common blackboard.

The head comprises a goal resolution area, and a set of process and strategy knowledge sources (KS). The goal resolution area receives incoming goals and posts them to the appropriate process KS. Each process KS implements a workflow or subworkflow. It operates by decomposing goals into subgoals and tasks. For further details refer to aforementioned U.S. Pat. No. 5,638,494. Subgoals are posted back to the goal resolution area, and tasks are processed by knowledge sources in the body. Each subgoal is then posted to another process KS or a strategy KS. For example, the process KS for handling "verify the client identity" service requests activates the "similar names" strategy by posting a subgoal to it upon receiving such a service request. In addition, a process KS can post data to the blackboard and read hypotheses from the blackboard, which were posted by a strategy KS. This is another way process and strategy KSs communicate.

Each strategy KS implements a strategy for detecting and resolving ambiguities in the data posted to the blackboard by a knowledge source in the body. It employs a mixture of algorithms (for example, for computing the similarity between two database entries), and if-then rules, as they are found in expert systems, and produces hypotheses which are posted to the blackboard where they become visible to process KSs and other strategy KSs. During its execution, a strategy KS also reads data from the blackboard previously posted by a process KS.

Figure 4:
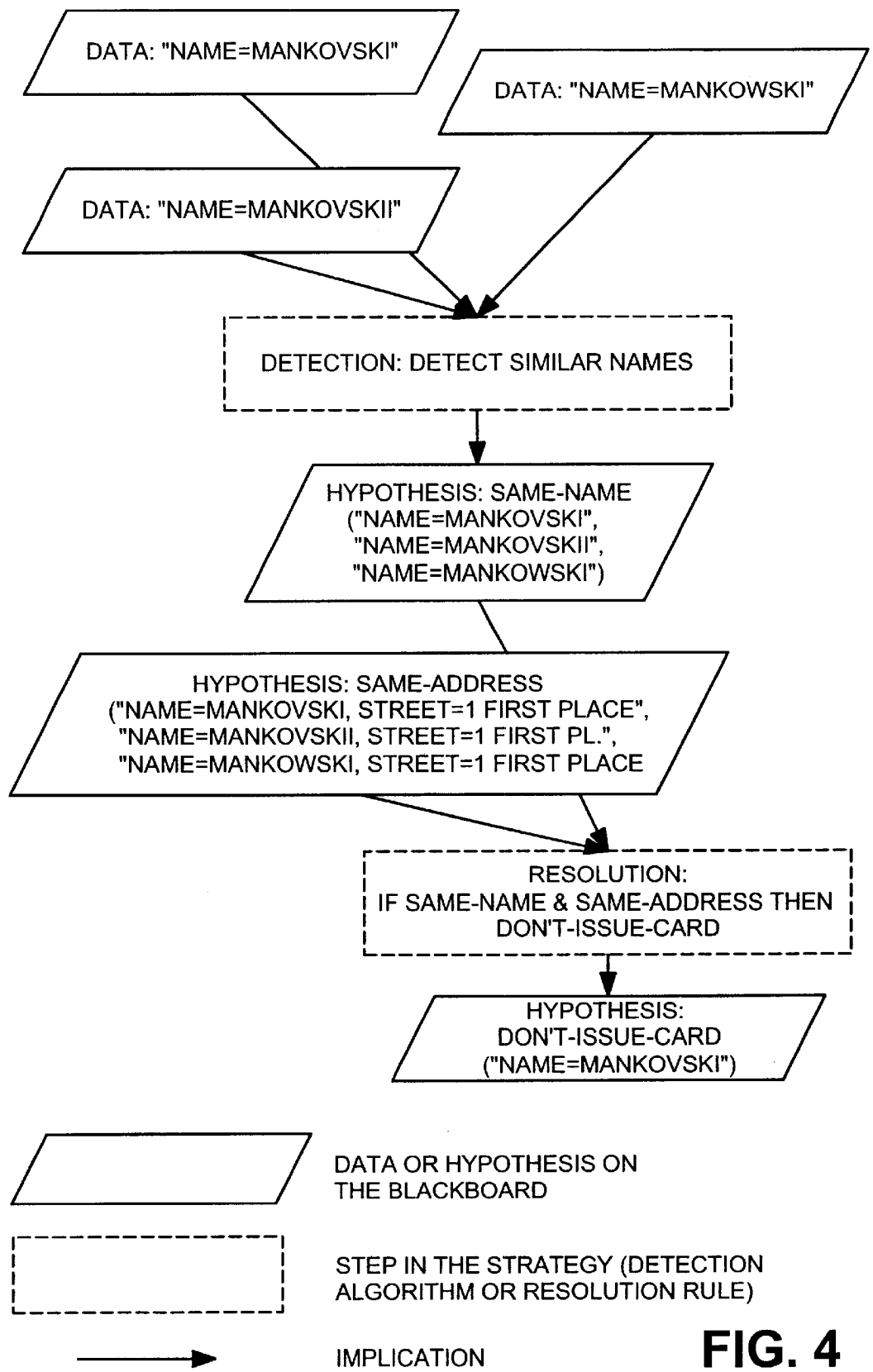
FIG. 4 is a diagram of the information flow resulting from a set of similar database entries, i.e. similar names.

For example, given a set of similar database entries as in FIG. 4, the "similar names" strategy KS would post a hypothesis that different database entries actually represent the same client. This hypothesis would then trigger if-then else rules in the KS, which may result in the conclusion that the client should not be issued a card. This conclusion is again posted to the blackboard as a hypothesis. This hypothesis is then interpreted by the process KS which activated the "similar names" strategy KS as a result to the service request to verify the client identity. FIG. 4 shows the trace of the resulting flow of information.

The body contains a set of agent adapter and resource adapter KSs. Each agent adapter KS provides a mechanism to send a goal to another agent over which this agent has a usage right. It triggers when an outgoing goal is posted to the blackboard by one of the process KSs. Each resource adapter KS provides an interface to an attached resource, for example, a database. It can interpret tasks posted to the blackboard and translates them into appropriate API calls on the resource. It also interprets callbacks from the resource as triggers to knowledge sources in the head. In particular the callback can be used to pass back a result to a service request (for example, a database query). For further details see the U.S. Pat. No. 5,638,494 patent.

The invention can be applied to improve call center routing. Here data mining would be used to match an incoming call with the most appropriate human agent. Conventionally, a call center application maintains a database of customers and information on previous calls by these customers (such as a trouble-ticket number). However, the information that can be used to match a caller to a human agent is limited to "hard" information such as the caller id or a trouble-ticket number. Such hard information is not always available, for example, the caller might be calling from a hotel (not from his home) phone.

The name of the customer is already a piece of "soft" information, because of the different ways a name could be entered by the attendant taking the call when it first arrives at the call center. In the described scenario of a caller calling from a hotel phone, other information must be taken into account to route the call. One application of the invention would be to ask the caller a series of questions (name, trouble ticket number, contact, etc.), making use of speech recognition or based on the information entered by the attendant, to identify whether the caller has called the center before, whether it is an important customer etc. so as to allow routing to the appropriate human agent.

In summary, more information about a caller can be used to make better routing decisions in a call center ("soft" information being an example). The information will be ambiguous and distributed on multiple databases. The mechanisms described in the present application address these issues and can thus improve the quality of response of a call center application.

While particular embodiments have been described and illustrated it will be apparent to one skilled in the art that numerous changes can be made to the basic concept. It is to be understood that such changes will fall within the scope of the invention as defined by the appended claims.

What is claimed is:

1. An agent-based networking system for creating a data warehouse on demand and permitting immediate mining of application specific data from said data warehouse comprising:

a network of multiple, interconnected distributed databases;

a user agent connected to the network for initiating an application specific request for data;

a plurality of functional agents for receiving goals from said user agent and for invoking processes for completing said goals, said goals including selecting, cleaning and updating data; and a plurality of resource agents, each associated with one of said distributed databases, for receiving and storing goals from said functional agents and obtaining, immediately, application specific data from appropriate databases for use by said user agent.

2. An agent-based system as defined in claim 1 wherein said network is a local area network (LAN) and said agents and databases are operating in computers.

3. An agent-based system as defined in claim 2 wherein said agents employ specific strategies for identifying and resolving data ambiguities in said distributed databases.

4. An agent-based system as defined in claim 1 wherein each of said agents have a control subsystem (head) and an action subsystem (body).

5. An agent-based system as defined in claim 4 wherein said control subsystem (head) includes a process knowledge source and a strategy knowledge source.

6. An agent-based system as defined in claim 4 wherein said control subsystem (head) includes a set of process knowledge sources and a set of strategy knowledge sources.

7. An agent-based system as defined in claim 4 wherein said action subsystem (body) includes an agent adapter knowledge source and a resource adapter knowledge source.

8. An agent-based system as defined in claim 4 wherein said action subsystem (body) includes a set of agent adapter knowledge sources and a set of resource adapter knowledge sources.

9. An agent-based system as defined in claim 4 including a blackboard between said control subsystem (head) and said action subsystem (body), said blackboard for use in communicating between said subsystems.

10. An agent-based system as defined in claim 3 for mining data relating to issuing credit cards.

11. An agent-based system as defined in claim 3 for mining data relating to telephone call routing.

12. A method of generating an application specific data warehouse on demand to permit immediate mining of application specific data from the data warehouse utilizing an agent based networking system, the method comprising:

providing a network of multiple, interconnected distributed databases;

providing a user agent connected to said network for entering a request for application specific data;

providing a plurality of functional agents for receiving goals from said user agent and for invoking processes for completing said goals, said goals including selecting, cleaning and updating data; and providing a plurality of resource agents associated with said distributed databases for receiving and storing goals from said functional agents and obtaining, immediately, application specific data from appropriated databases.

13. A method as described in claim 12 wherein said network of distributed databases is interconnected through a local area network (LAN) and said databases are operating in computers.

14. A method as described in claim 12 wherein said agents have a control subsystem (head) and an action subsystem (body).

15. A method as defined in claim 14 wherein said subsystems communicate via a blackboard.

* * * * *